United States Patent [19]
Takei

[11] Patent Number: 5,373,754
[45] Date of Patent: Dec. 20, 1994

[54] BALL SCREW
[75] Inventor: Seiji Takei, Kanagawa, Japan
[73] Assignee: Nippon Thompson Co., Ltd., Tokyo, Japan
[21] Appl. No.: 90,264
[22] Filed: Jul. 13, 1993
[30] Foreign Application Priority Data
  Jul. 24, 1992 [JP] Japan .................. 4-057467
[51] Int. Cl.$^5$ .......................... F16H 25/20
[52] U.S. Cl. .............. 74/424.8 NA; 74/424.8 R; 74/459
[58] Field of Search ........ 74/89.15, 424.8 R, 424.8 B, 74/459, 424.8 NA; 49/138, 362
[56] References Cited

U.S. PATENT DOCUMENTS

| | | | |
|---|---|---|---|
| 772,917 | 10/1904 | Bitner ..................... | 49/138 |
| 3,389,612 | 6/1968 | Thireau ................... | 74/89.15 |
| 4,542,661 | 9/1985 | Teramachi ............... | 74/89.15 X |

FOREIGN PATENT DOCUMENTS

| | | | |
|---|---|---|---|
| 44-15206 | 7/1969 | Japan . | |
| 63-158351 | 7/1988 | Japan ........................ | 74/424.8 R |
| 857203 | 12/1920 | United Kingdom ....... | 74/424.8 B |

Primary Examiner—Allan D. Herrmann
Attorney, Agent, or Firm—Sughrue, Mion, Zinn, Macpeak & Seas

[57] ABSTRACT

A ball screw that, together with contributing to reduction of the cost of the device wherein it is incorporated as a feed mechanism, eliminates the need for adjustment work performed to maintain the operation state of the object being operated, for example, an automatic door. The thread pitch of a threaded portion of a screw shaft is varied from one end to the other.

4 Claims, 3 Drawing Sheets

BALL SCREW

BACKGROUND OF THE INVENTION

1. Field of the Invention

The present invention relates to a ball screw, and more particularly, to a ball screw suitable for use as a feed mechanism for automatic doors, and so forth.

2. Description of the Prior Art

FIGS. 1 and 2 indicate one example of a ball screw of this type. Such as ball screw is disclosed in, for example, Examined Patent Publication No. 44-15206.

In the drawings, screw shaft 1 has 3 lines of threads, and nut 2 floats, i.e. is supported on screw shaft 1. Circular groove 2a is formed in the inner circumference of nut 2, and a number of balls 3 equal to the number of threads of screw shaft 1, namely 3, are arranged within the circular groove 2a. These balls 3 are each engaged with each of the three screw threads 1a of screw shaft 1.

The ball screw having the constitution described above is used, for example, in a feed mechanism of a door in an automatic door device. Namely, by attaching nut 2 to a door, providing screw shaft 1 on the stationary side, and rotating screw shaft 1 by applying torque to screw shaft 1 by a motor 1, nut 2 reciprocates along screw shaft to perform opening and closing operations of the door.

However, in an automatic door, operation should be performed at a relatively low speed, in comparison with the intermediate portion of the opening and closing stroke, at the portions before and after the intermediate portion do promote safety. This speed controlling operation was achieved by, for example, using a servo motor as the motor for torque generation, and controlling the angular speed of the servo motor.

However, in this constitution, in addition to requiring the use of a relatively expensive servo motor, it is also necessary to provide a control circuit for control of the speed of the motor. In addition to this resulting in increased costs, since shifts in the accelerating and slowing points as well as stopping position of the door occur due to drifting of the motor speed and so on, adjustment must be performed frequently.

SUMMARY OF THE INVENTION

In consideration of the problems of the prior art described above, the object of the present invention is to provide a ball screw that, in addition to contributing to reduced costs of devices in which it is to be incorporated to function as a feed mechanism, does not require adjustment work for maintaining the operating condition of the object it operates, for example, an automatic door.

The present invention comprises a ball screw equipped with: a screw shaft; a nut that floats on said screw shaft, wherein a circular groove is formed in its inner circumference along a surface perpendicular to the center of that cylinder; and, balls arranged within the circular groove, and engaged with screw grooves of the screw shaft; wherein, the thread pitch of the threaded portion of the screw shaft is varied at intervals from one end to the other.

DESCRIPTION OF THE PREFERRED EMBODIMENTS

The following provides an explanation of a ball screw as an embodiment of the present invention with reference to the attached drawings.

Figure 1:
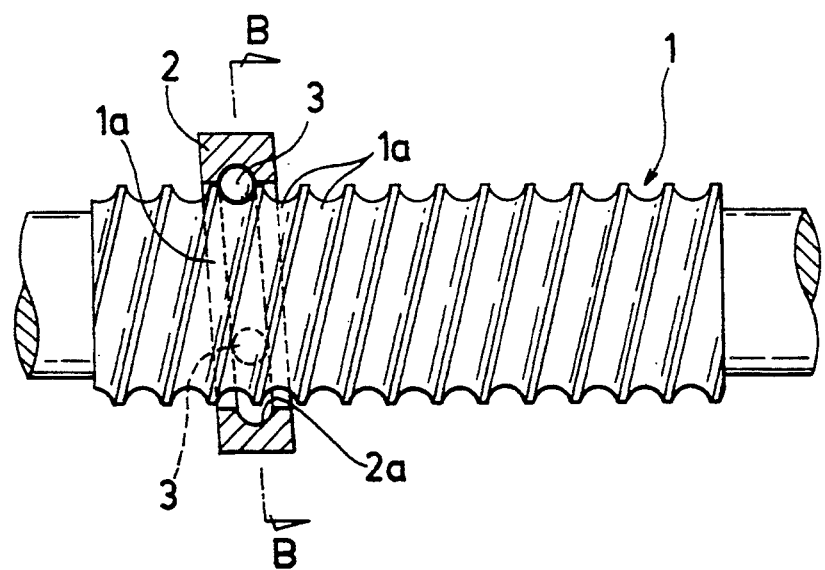
FIG. 1 is a front view, including a partial cross-section, of a ball screw of the prior art.
Figure 2:
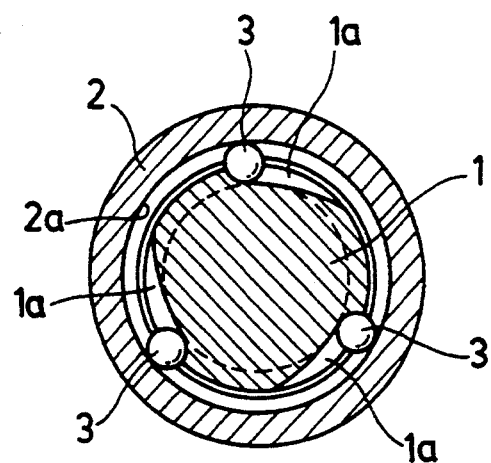
FIG. 2 is a cross-sectional view taken along lines 2—2 relating to FIG. 1.
Figure 3:
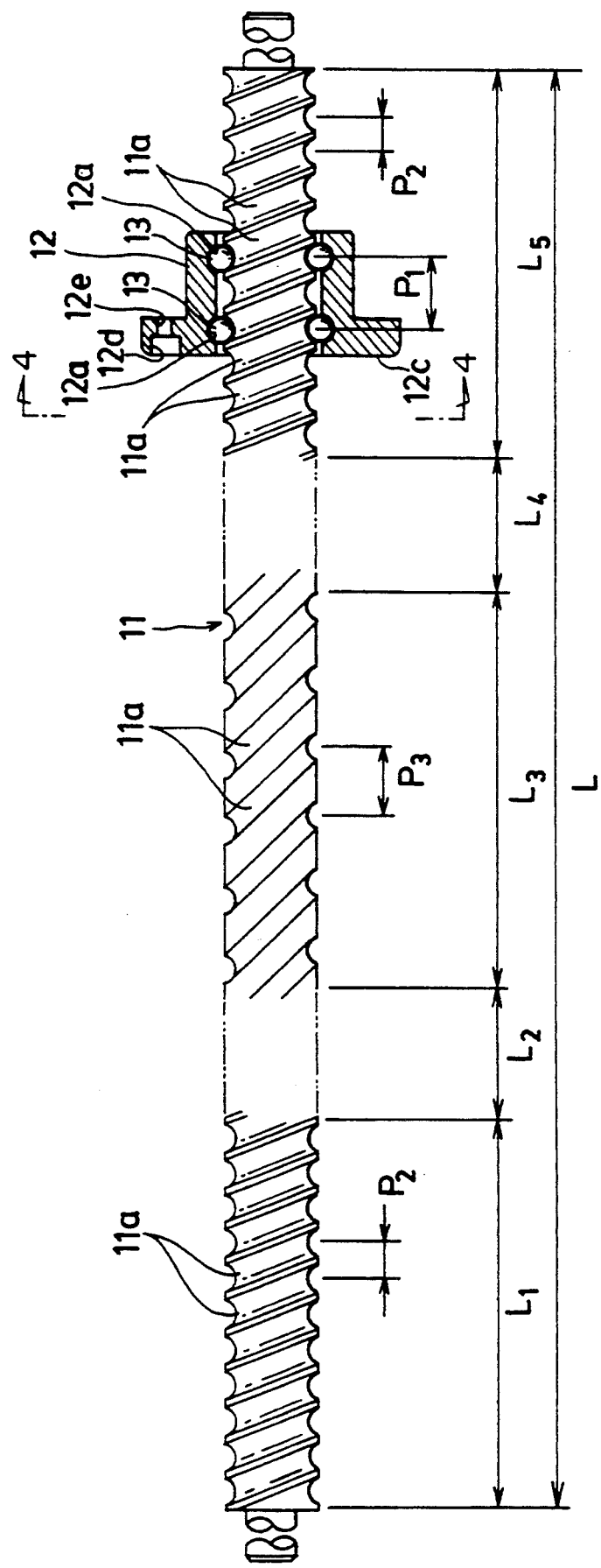
FIG. 3 is a front view, including a partial cross-section, of a ball screw as an embodiment of the present invention.
Figure 4:
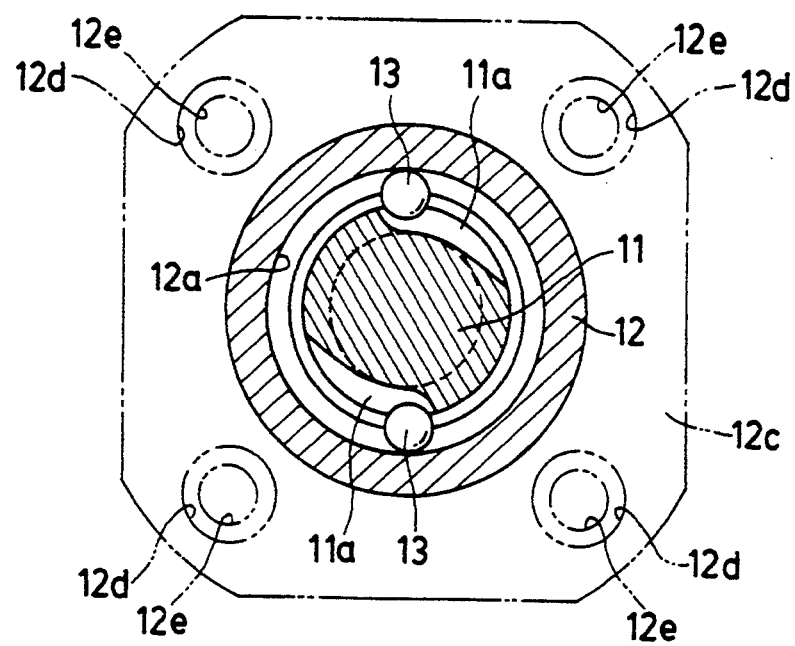
FIG. 4 is a cross-sectional view taken along lines 4—4 relating to FIG. 3.

In FIG. 3, screw shaft 11 has, in this case, two lines of threads, and the entire length has threaded portion L. As is clear from FIG. 4, nut 12 is formed into a substantially cylindrical shape, and floats, i.e. is supported, on screw shaft 11. A number of circular grooves 12a, for example two, are formed at a prescribed pitch $P_1$ in the inner circumference of nut 12 along a surface perpendicular to the center of that cylinder, i.e. the axis of the nut. Furthermore, flange 12c is formed on one end of nut 12, and as is clear from FIG. 4, a number of countersunk portions 12d and threaded insertion holes 12e, for example 4, are provided at an equal pitch in this flange 12c. A door, to be described hereinafter, is fastened to this flange 12c, and the heads and threaded portions of fastening bolts are inserted into these countersunk portions 12d and threaded insertion holes 12e. In addition, a key and so forth may also be used as a device for connecting this nut 12 and door in addition to the bolt fastening method claimed.

Figure 5:
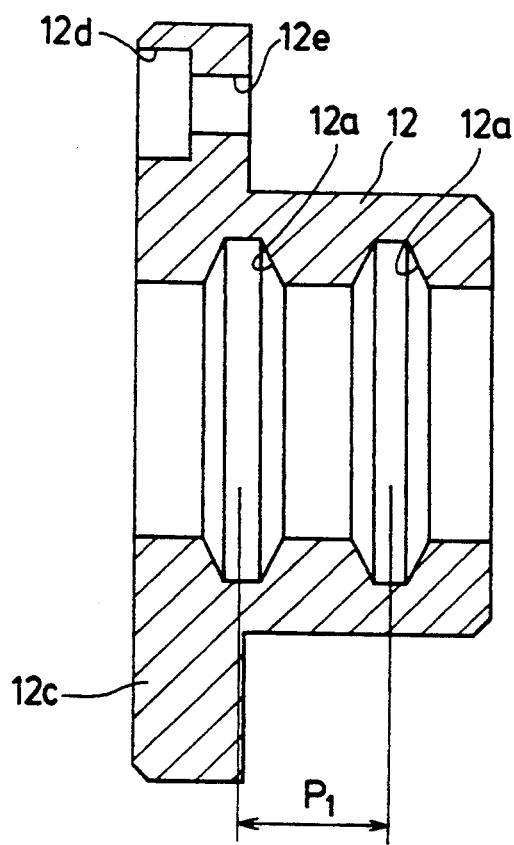
FIG. 5 is a vertical cross-sectional view of a nut equipped on the ball screw indicated in FIGS. 3 and 4.

Furthermore, as is clear from FIG. 5, although the cross-sectional shape of the circular grooves 12a is, for example, trapezoidal, the circular grooves 12a may be formed to have a ball track surface having a radius slightly larger than the radius of the balls similar to screw shaft 11. In addition, as described above, by forming a plurality of circular grooves 12a in nut 12 and arranging a number of balls 13 equal to the number of threads of screw shaft 11 in each of said circular grooves 12a, the number of balls 13 juxtaposed between screw shaft 11 and nut 12 increases, thereby increasing the stability of the assembled state of nut 12 with respect to screw shaft 11.

A number of balls 13 equal to the number of threads of screw shaft 11, namely two each, are arranged within each circular groove 12a formed in nut 12. Each one of these balls 13 engages with a respective one of the two screw threads 11a of screw shaft 11. Furthermore, in addition to the form of said screw threads 11a being arc-shaped as in the present embodiment, it goes without saying that other forms can also be applied as necessary, such as those having a triangular or trapezoidal shape.

The following provides a detailed description of the form of the threaded portion L of screw shaft 11.

As indicated in FIG. 3, the entire length L of the threaded portion is divided into five sections $L_1$ through $L_5$ from one end to the other, and screw threads 11a, formed in the two sections of length $L_1$ and $L_5$ located at both ends of screw shaft 11, have a mutually equal thread pitch in the form of $P_2$ The thread pitch $P_3$ of screw threads 11a, formed in the section of length $L_3$ located in the center of screw shaft 11, is larger than thread pitch $P_2$ of sections of length $L_1$ and $L_5$ located on both ends. Furthermore, although not shown in the drawings, in the sections of lengths $L_2$ and $L_4$ located between sections $L_1$ and $L_5$ on both ends and central section $L_3$, thread pitch is formed to gradually increase or decrease from one end to the other of each of said lengths $L_2$ and $L_4$ to be continuous from said thread pitch $P_2$ to $P_3$ and from thread pitch $P_3$ to $P_2$.

The following provides an explanation of the operation performed in the case a ball screw of the constitution described above is incorporated in a door feed mechanism of, for example, an automatic door device.

Namely, when screw shaft 11 is rotated and driven by a motor (not shown) at a constant an equal speed, the door operates at a relatively low speed due to the action of the section of length $L_1$ of screw shaft 11 during initial operation. The door is then accelerated at the section of length $L_2$ and then fed rapidly by the section of length $L_3$. The door is then decelerated by the section of length $L_4$ after which it is driven at low speed by the section of length $L_5$ until closing or opening to complete operation.

Furthermore, the manner of changing of thread pitch of screw shaft 11 is not limited to the constitution described above, but rather various other constitutions can also be employed. In addition, the device wherein it is incorporated is also not limited to an automatic door.

In addition, although screw shaft 11 has two lines of threads in the embodiment described above, the present invention can naturally also be applied to a ball screw having a screw shaft of three lines of threads or more.

Moreover, although not shown in the drawings, screw shaft 11 may also have only 1 thread. However, in this case, it is necessary that circular grooves 12a of nut 12 be formed with a plurality of threads, and preferably 3 threads, at a prescribed pitch $P_1$, and that balls 13 be arranged within each of said circular grooves 12a in order to stabilize the assembled state of nut 12 with respect to screw shaft 11.

In addition, although the ball screw indicated in FIG. 3 is incorporated as a feed mechanism of a single swing automatic door that performs opening and closing of a single door, the constitution described below (not shown in the drawings) is an example of a ball screw suitable for use as a feed mechanism of a double swing automatic door that relatively opens and closes two doors.

Namely, a screw shaft is formed that, together with having a clockwise threaded section similar to the section indicated with length L in FIG. 3 on one of its sides, with substantially the central section as the point of demarcation, also has a counterclockwise threaded section on its other side symmetrically shaped with respect to said clockwise threaded section. Nuts are then arranged on each of these clockwise threaded and counterclockwise threaded sections.

According to the present invention as explained above, since the threaded portion of a screw shaft is varied at intervals from one end to the other, the use of an expensive servo motor for braking and driving of an object, as well as the performing of rotation control by a control circuit, are not required, thus offering a first advantage of the present invention in terms of contributing to reduction of costs.

In addition, since the use of a ball screw according to the present invention results in the operating state of an automatic door and so forth only being affected by the state of change of thread pitch of a screw shaft, there is no risk of the occurrence of shifts in door position caused by drifting of motor speed and so on, thereby offering a second advantage of the present invention in the form of the absence of the need for frequent adjustments.

What is claimed is:

1. A ball screw comprising: a screw shaft having a plurality of continuous screw threads formed therein; a nut that is supported on said screw shaft, a plurality of circular grooves formed in an inner circumference of said nut at a predetermined pitch and, a number of balls equal to a number of said screw threads arranged within each of said circular grooves, each of said balls being engaged with a respective one of said screw threads of said screw shaft; wherein, the thread pitch of said screw threads of said screw shaft varies along the length of said screw shaft.

2. The ball screw of claim 1 wherein said screw shaft has a clockwise threaded section having clockwise screw threads and a counterclockwise threaded section formed having counterclockwise screw threads with substantially the central portion of said screw shaft serving as the point of demarcation between said clockwise and said counterclockwise threaded sections.

3. The ball screw of claim 1 wherein said circular grooves are formed in planes which are perpendicular to an axis of said nut.

4. The ball screw of claim 1 wherein said grooves are semicircular in cross section.

* * * * *